Figure 1:
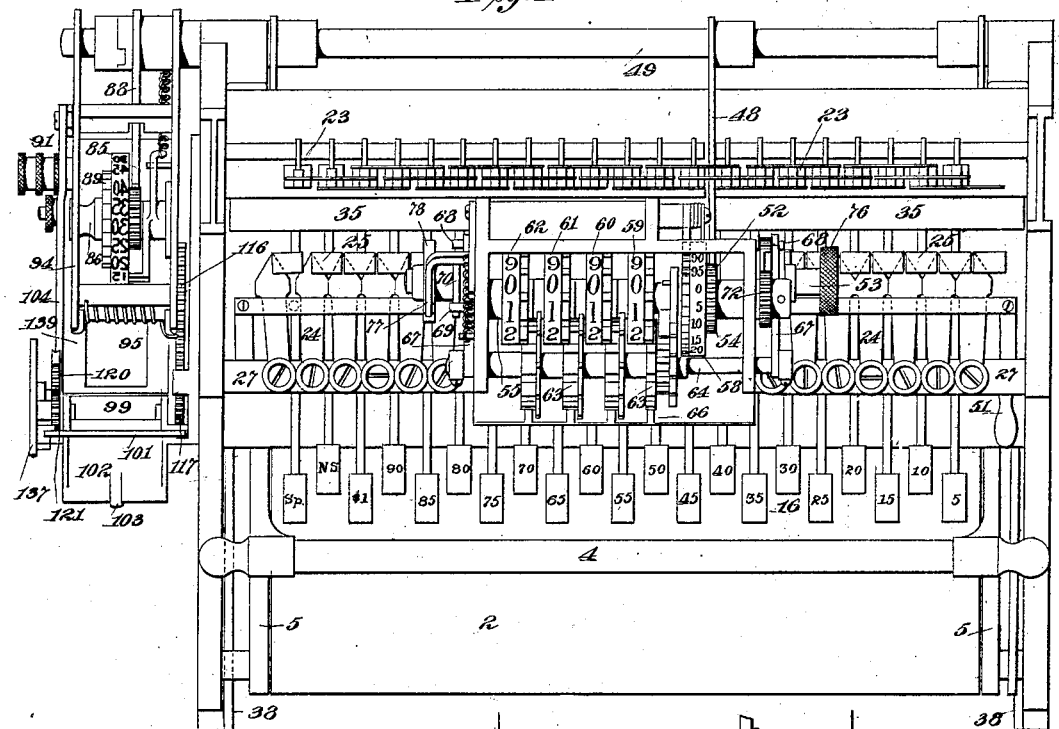

No. 723,906. PATENTED MAR. 31, 1903.
F. C. OSBORN.
CASH REGISTER.
APPLICATION FILED MAY 27, 1899.
NO MODEL. 11 SHEETS—SHEET 1.

Witnesses: Inventor

No. 723,906. PATENTED MAR. 31, 1903.
F. C. OSBORN.
CASH REGISTER.
APPLICATION FILED MAY 27, 1899.
NO MODEL. 11 SHEETS—SHEET 2.

Witnesses: Inventor
Francis C. Osborn
by Dyer Edmonds & Dyer
Att'ys.

No. 723,906. PATENTED MAR. 31, 1903.
F. C. OSBORN.
CASH REGISTER.
APPLICATION FILED MAY 27, 1899.
NO MODEL. 11 SHEETS—SHEET 3.

Witnesses: Inventor
Francis C. Osborn
by Dyer Edmonds & Dyer
Att'ys.

No. 723,906. PATENTED MAR. 31, 1903.
F. C. OSBORN.
CASH REGISTER.
APPLICATION FILED MAY 27, 1899.
NO MODEL. 11 SHEETS—SHEET 4.

Witnesses: Inventor
Francis C. Osborn
by Dyer Edmonds & Dyer
Att'ys.

No. 723,906. PATENTED MAR. 31, 1903.
F. C. OSBORN.
CASH REGISTER.
APPLICATION FILED MAY 27, 1899.
NO MODEL. 11 SHEETS—SHEET 5.
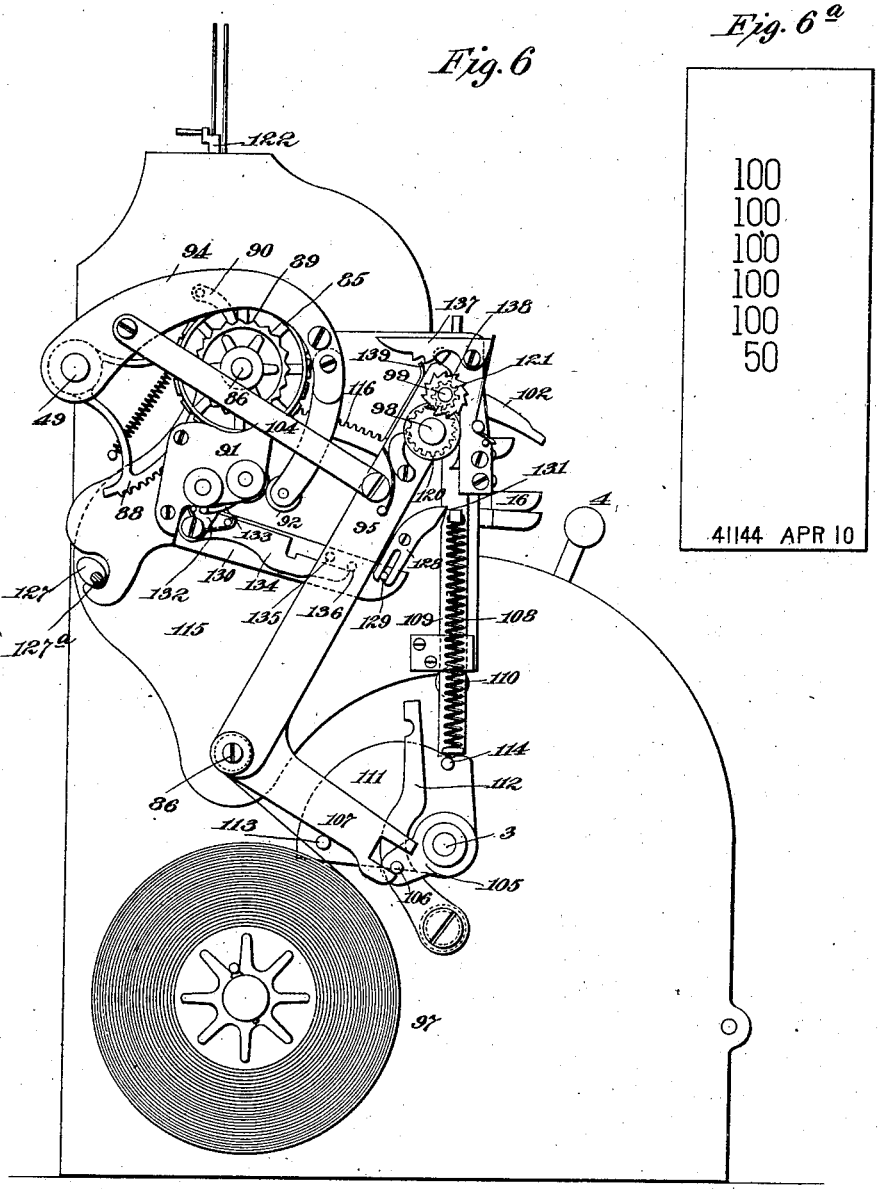

No. 723,906. PATENTED MAR. 31, 1903.
F. C. OSBORN.
CASH REGISTER.
APPLICATION FILED MAY 27, 1899.
NO MODEL. 11 SHEETS—SHEET 6.
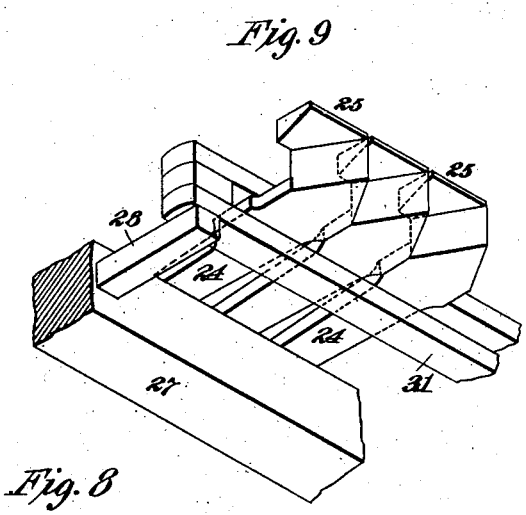
*Fig. 9*
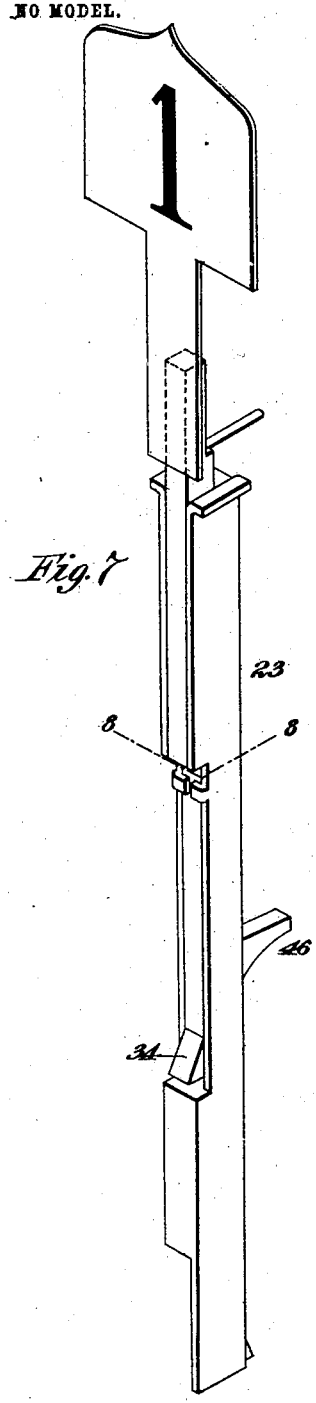
*Fig. 7*
*Fig. 8*
*Fig. 10*
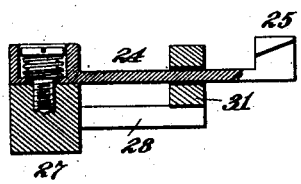
Witnesses: Inventor
Francis C. Osborn
by Ayer Edmonds Ayer
Att'ys.

No. 723,906. PATENTED MAR. 31, 1903.
F. C. OSBORN.
CASH REGISTER.
APPLICATION FILED MAY 27, 1899.
NO MODEL. 11 SHEETS—SHEET 8.

Witnesses: Inventor
Francis C. Osborn
by Ayer Edmonds & Ayer
Att'ys.

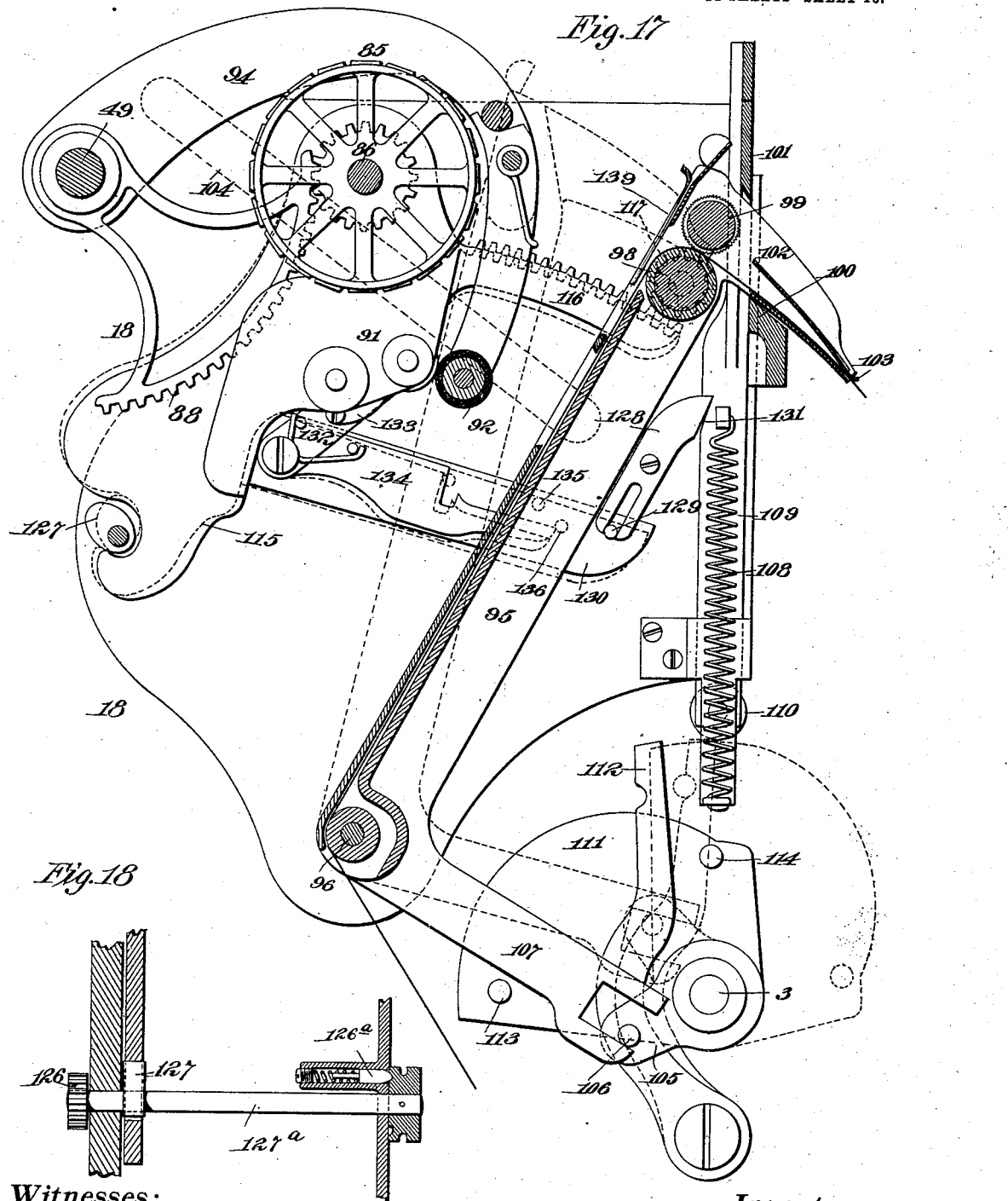

No. 723,906. PATENTED MAR. 31, 1903.
F. C. OSBORN.
CASH REGISTER.
APPLICATION FILED MAY 27, 1899.
NO MODEL. 11 SHEETS—SHEET 11.

Witnesses:
Inventor
Francis C. Osborn
by Dyer Edmonds & Dyer
Att'ys.

UNITED STATES PATENT OFFICE.

FRANCIS C. OSBORN, OF DETROIT, MICHIGAN, ASSIGNOR, BY MESNE ASSIGNMENTS, TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 723,906, dated March 31, 1903.

Application filed May 27, 1899. Serial No. 718,477. (No model.)

*To all whom it may concern:*

Be it known that I, FRANCIS C. OSBORN, a citizen of the United States, residing at Detroit, in the county of Wayne and State of Michigan, have invented certain new and useful Improvements in Cash-Registers, of which the following is a specification.

My invention relates to various new and useful improvements in cash-registers, and particularly to cash-registers which are capable of being effectively used as check-printers—that is to say, devices for recording amounts of sales on consecutively-numbered and properly-dated checks.

The preferred embodiment of the invention relates to a cash-register wherein a record may be graphically secured on a ribbon of paper representing the individual sales or when, if desired, a separate check may be issued simultaneously with the registering operation of the device representing the individual sales and where the till may be kept closed when it is desired to use the device solely as a check-printer.

The essential object of the invention is to provide a combined cash-register and check-printer which shall be simple in construction and effective in use. In accomplishing this object I provide a cash-register wherein the keys either directly or indirectly control the setting of a printing wheel or segment or a plurality of such wheels or segments. Subsequent to the operation of the key I operate an actuator for effecting the printing. When the device is used as a simple register, the operation of the actuator either directly or indirectly controls a relatively slow feed of a ribbon or strip of paper, whereby the different amounts representing the respective sales will be recorded on the strip in consecutive and close order. When the device is used as a simple check-printer or as a combined cash-register and check-printer, the feed of the strip is increased to a sufficient extent, as when it is cut off behind the printed amount a conveniently-formed check will result. A knife is therefore employed, which is thrown out of operation when the device is used as a continuous-strip printer, but which comes into play when the device is used as a check-printer or combined cash-register and check-printer, which knife is actuated through the instrumentality of the actuator subsequent to the feed operation, this operation taking place, as stated, after the printing action. I provide simple means by which the feed mechanism may be thus varied and the cut-off mechanism may be thus thrown into or out of operation when the apparatus is to be converted from one type of machine into another type. Preferably the means employed to effect these ends are controlled through the operation of a special key, (similar in its operation and arrangement to the cash and no-sale keys,) so that it becomes only necessary for the operator to first depress the special key and then a key representing the amount of a sale to secure a record of the individual sales on the strip or ribbon, throwing out the cut-off device. This feature of the invention is of importance in another respect. By providing a register wherein at will the feed can be changed and the cut-off mechanism thrown out of action it becomes possible to print checks aggregating amounts far in excess of the normal capacity of the machine. Thus with a register having keys representing amounts in five cents up to a dollar it will be possible by first depressing the special key, then the dollar-key, and by then operating the actuator to effect a record of one dollar upon the paper strip without operating the cut-off, to then depress a second key without actuating the special key, whereby the second amount will be printed upon the strip beneath the first record, and the check will then be cut off, numbered, and dated, it being understood that the throwing out of the cut-off and the changing of the feed mechanism results in the corresponding throwing out of the consecutive numbering and dating devices. I also provide means by which the machine may be converted into a continuous-strip printer. Preferably this is accomplished by means of a cam located at the printing end of the machine and readily accessible from the outside of the casing by which the dating, numbering, and check-feeding devices may be cut out of operation and locked in that position. It will be understood that when the machine is used only as a continuous printer a no-sale key and a cash-till will be used; but when used as a check-printer alone the till and no-sale key are of no use and may be omitted.

Another object of the invention is to improve the construction and increase the efficiency of printing or embossing mechanisms employed in connection with cash-registers or check-printers. To effect this object, I employ a tablet-wheel, a segment, tablet-wheels or segments the various positions of which are controlled or effected by or through the keys and I pivot with respect to said printing and embossing mechanisms a platen through which extends the paper strip. This platen is arranged so that when it is moved pivotally the paper strip will be engaged with the printing or embossing mechanism to receive a record therefrom. The platen carries at its upper end a feed-trough, through which the paper strip passes and between which and the impression-surface of the platen are placed the feed-rollers for effecting the feeding operation. By setting the printing or embossing mechanism through or by the operation of the keys and by then swinging the platen on its pivot a record will be secured on the paper strip. Upon the return of the platen from the printing or embossing mechanism the feed takes place and the strip will be forced out through the feed-trough, which will on the completion of the return stroke project through an opening in the front of the casing. When used as a check-printer, this is of advantage. The check will be cut off and will be carried to the opening in the casing by the feed-trough into position to be conveniently reached. Ordinarily difficulty has been experienced after a check has been printed in placing it into position to be reached by the operator, and it is the general practice to provide means for forcibly ejecting checks, after being cut off, from the machine. In my device I am enabled to carry the check after being cut off into convenient position to be reached without requiring an excessive length of check. By employing a swinging platen which coöperates with the printing or embossing mechanism it becomes possible to print upon a check the amount of a subsequent sale. I consider this an advantageous feature, since with ordinary check-printers it becomes necessary to furnish the customer with a second check should a purchase be made after a check has been issued, and it becomes possible in this way to effect a fraud by presenting for payment only one of the checks so issued. In my check-printer, owing to the general accessibility of the platen to the operator, it is only necessary when a new amount requires to be printed upon a check to reinsert the check in the platen and by then first throwing out the consecutive numbering and dating mechanism to print the new amount or any additional amounts upon the check, thus securing upon one check a record of a plurality of separate sales.

Another object of my invention is to improve the construction of the total-adding-register mechanism of a cash-register, which improvements are designed particularly to facilitate the resetting operation of the register. In effecting this object I employ a register-shaft on which are carried a plurality of register-disks. A disk of lower order is operated directly by or through the intermediation of the keys, while the other disks are operated through carrying-pinions from the disks of lower order, as is common in register mechanisms. The carrying-pinions are arranged on a shaft having movement toward and away from the register-disks. A resetting-shaft is mounted parallel to the register-shaft and is provided with cams which serve to withdraw and advance the carrying-pinions away from and toward the register-disks. The resetting-shaft is also provided with connections for a reverse movement of the register-shaft during the interim in which the carrying-pinions are withdrawn from the register-disks. This reverse movement of the register-shafts carries all the register-wheels to zero, as is common. The entire mechanism is simple and effective and is of such a character that false registrations are impossible.

Another object of the invention is to improve and simplify the construction of the tablet-releasing mechanism of a cash-register employing an actuator for exposing the tablet selected by the depression of a key, the key movement releasing the actuator. To effect this object, I employ a pivoted wing mounted on a rock-shaft adjacent to all the tablet-rods and adapted to engage beneath a lug on any rod or rods which may be elevated. A lever is pivoted on the rock-shaft in such a way that when moved in one direction it will tilt the rock-shaft to release any elevated tablet-rod, but when moved in the other direction it will not affect the position of the wing. This lever is provided with an inclined cam thereon, with which engages a stud carried on the actuator, this engagement taking place at the commencement of the positive stroke and near the end of the negative stroke. Upon the positive stroke of the actuator the holding-wing will be withdrawn to drop the tablet, but in the movement in the other direction on the negative stroke a tablet which may have been exposed during the positive stroke will not be dropped, but will remain exposed until a new sale is made. Preferably the mechanism just referred to coöperates with the trapping mechanism for the keys, whereby when the tripping-lever is actuated on the negative stroke it untraps the depressed key or keys.

Another object of the invention is to simplify the construction of the tripping mechanism for the till-cover of a cash-register of the Osborn type, wherein the cover is released near the completion of the positive stroke of an actuator unlocked by the depression of a key. In effecting this object I provide, preferably, a rotary till-cover carrying a lug, behind which engages a latch to hold the cover normally closed. This latch is carried on a rock-shaft, from which depends an arm arranged in the path of movement of a stud carried on the actuator, whereby when the actuator approaches the end of its positive stroke the rock-shaft will be tilted to unlock the cover, which can then be opened or which will be forced open by a suitable motor device.

In order that my invention may be better understood, attention is directed to the accompanying drawings, wherein I have illustrated a combined cash-register and check-printer embodying my present improvements. In these drawings a register is shown of the Osborn type, having a stationary till and a rotary till-cover. It is to be understood, however, that my improvements may be employed in connection with other varieties of cash-registers employing keys for setting or for effecting the setting of a printing or embossing mechanism and an actuator for effecting the printing or embossing operation.

Figure 2:
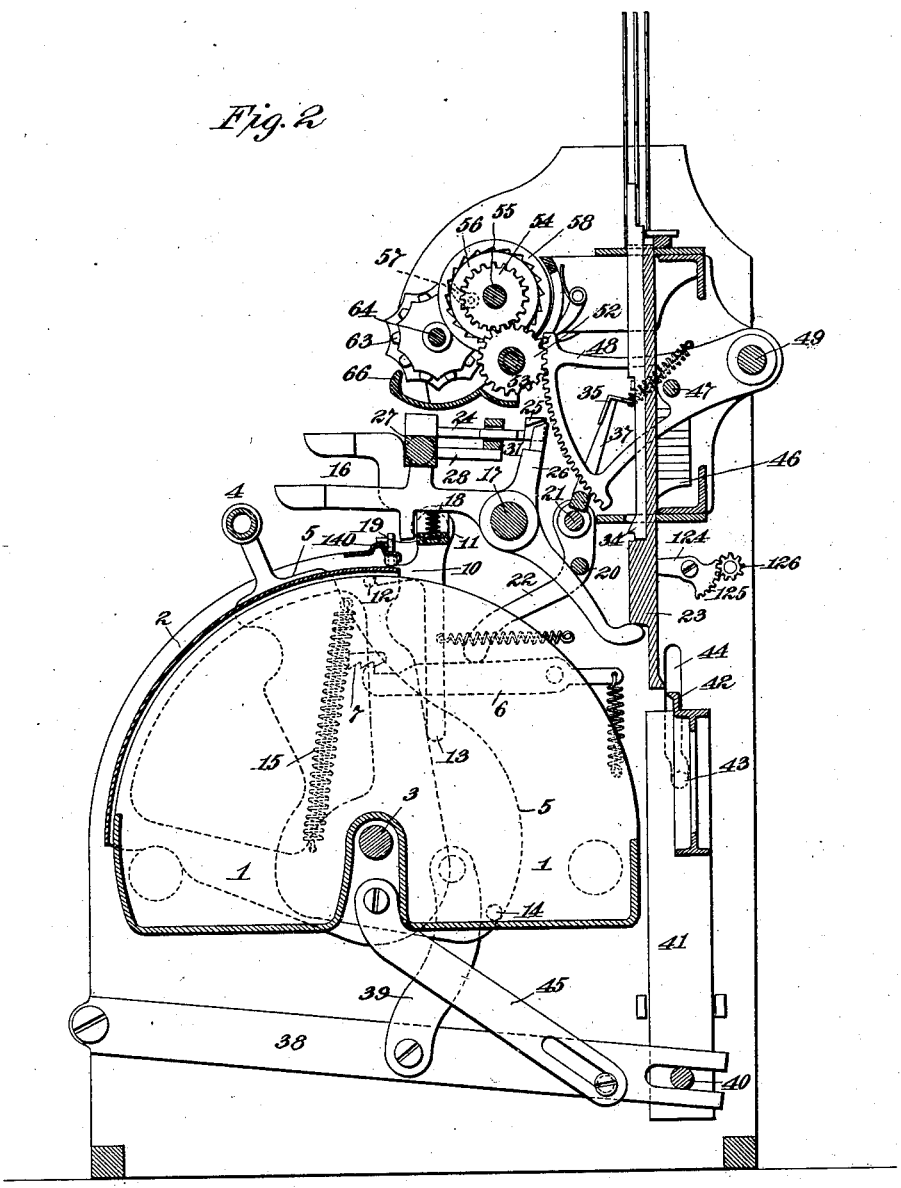
Figure 4:
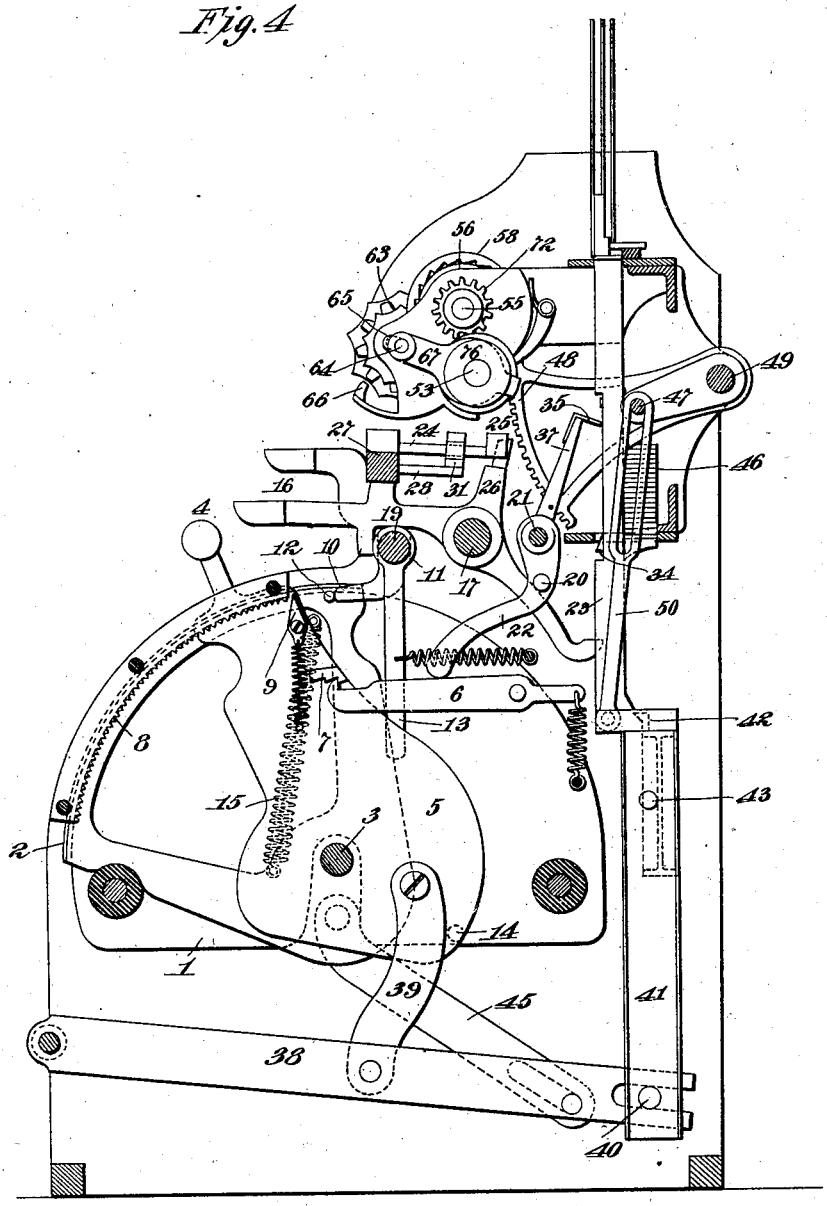
Figure 5:
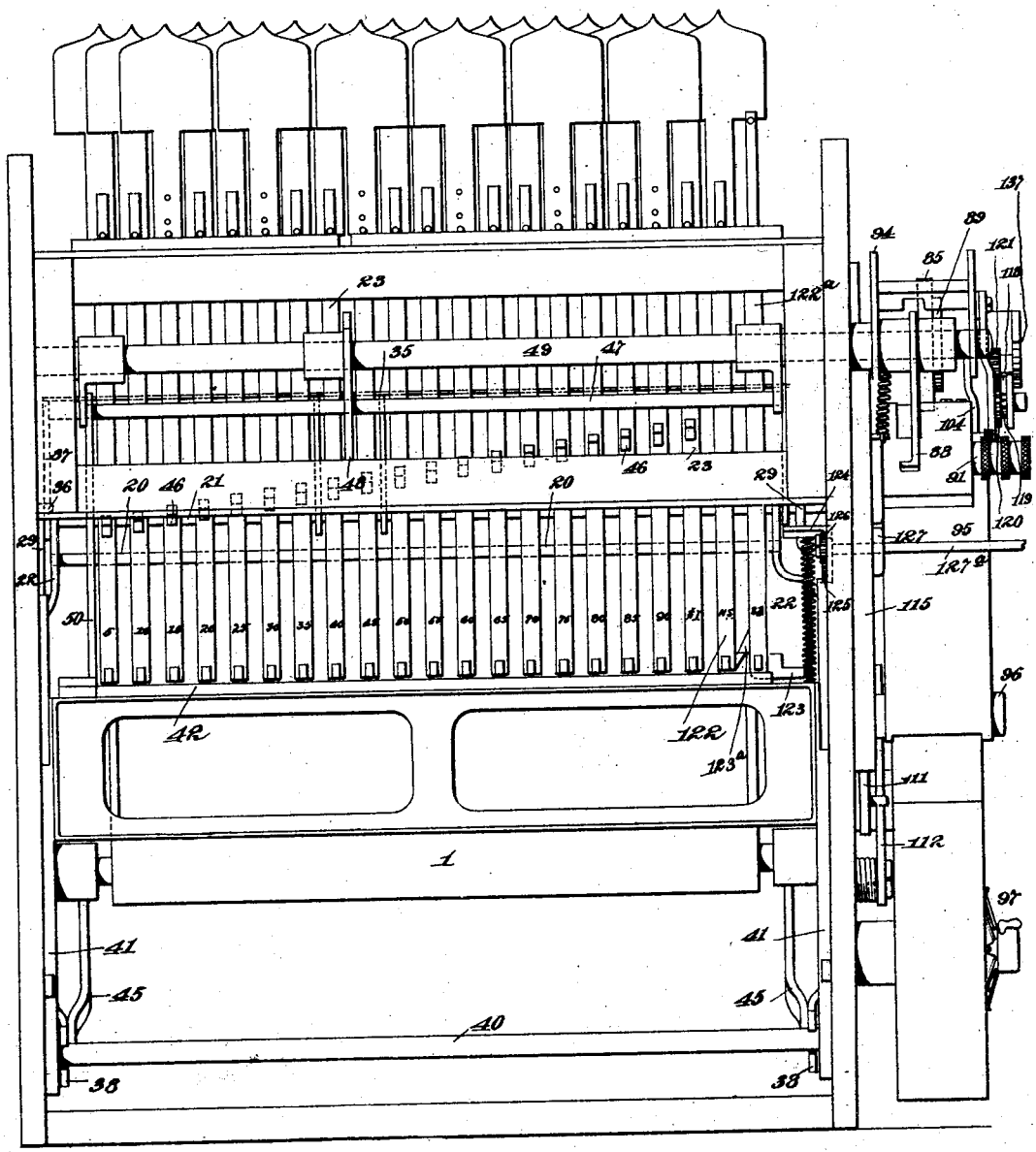
Figure 11:
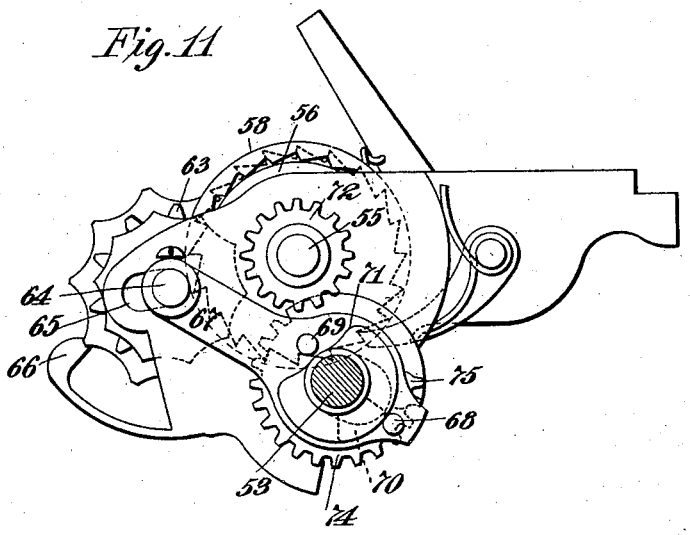
Figure 12:
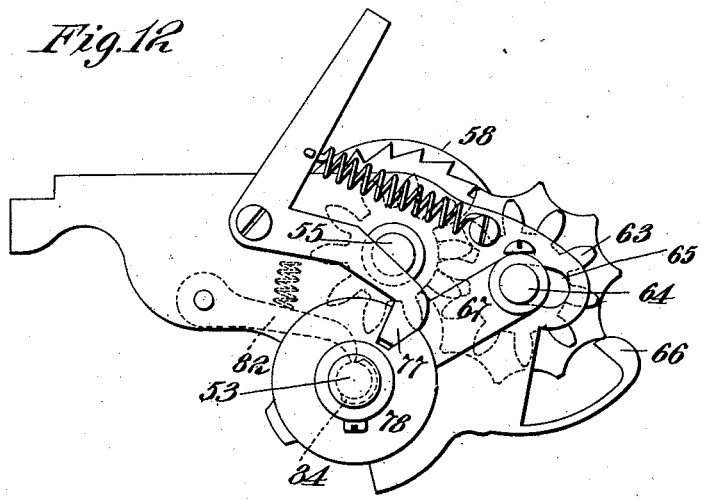
Figure 13:
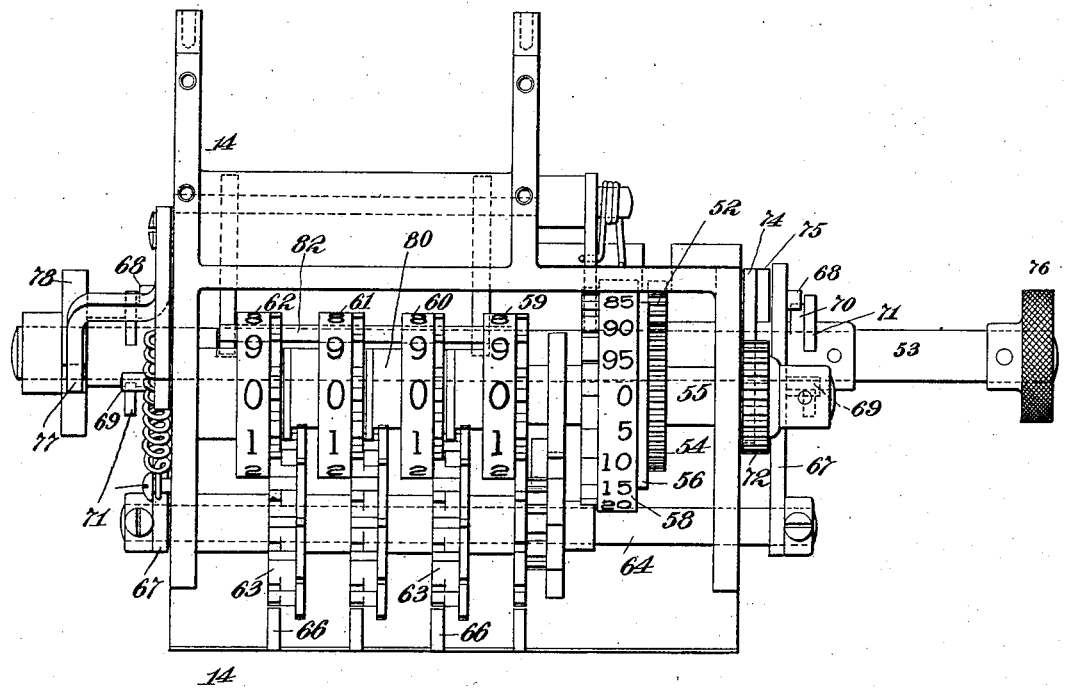
Figure 14:
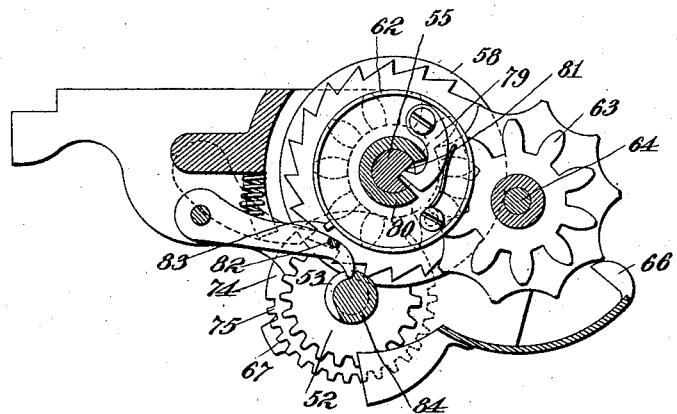
Figure 15:
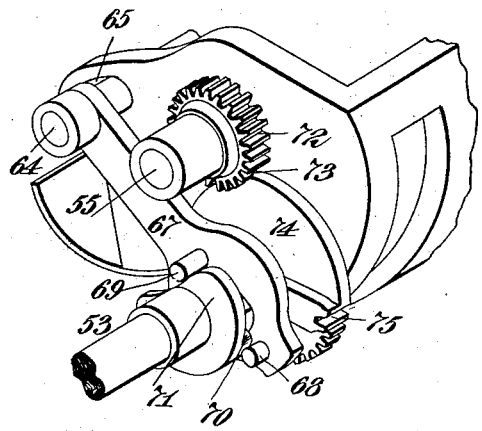
Figure 16:
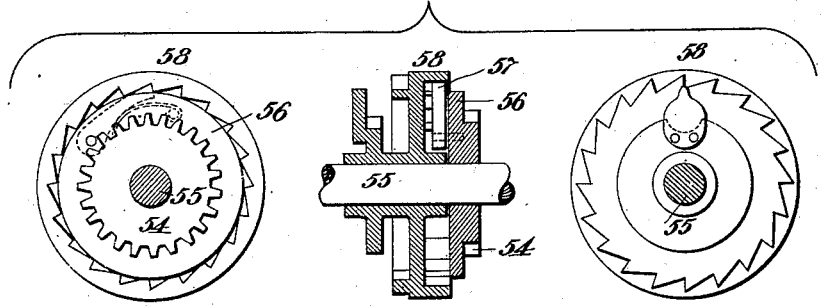
Figures 19, 20:
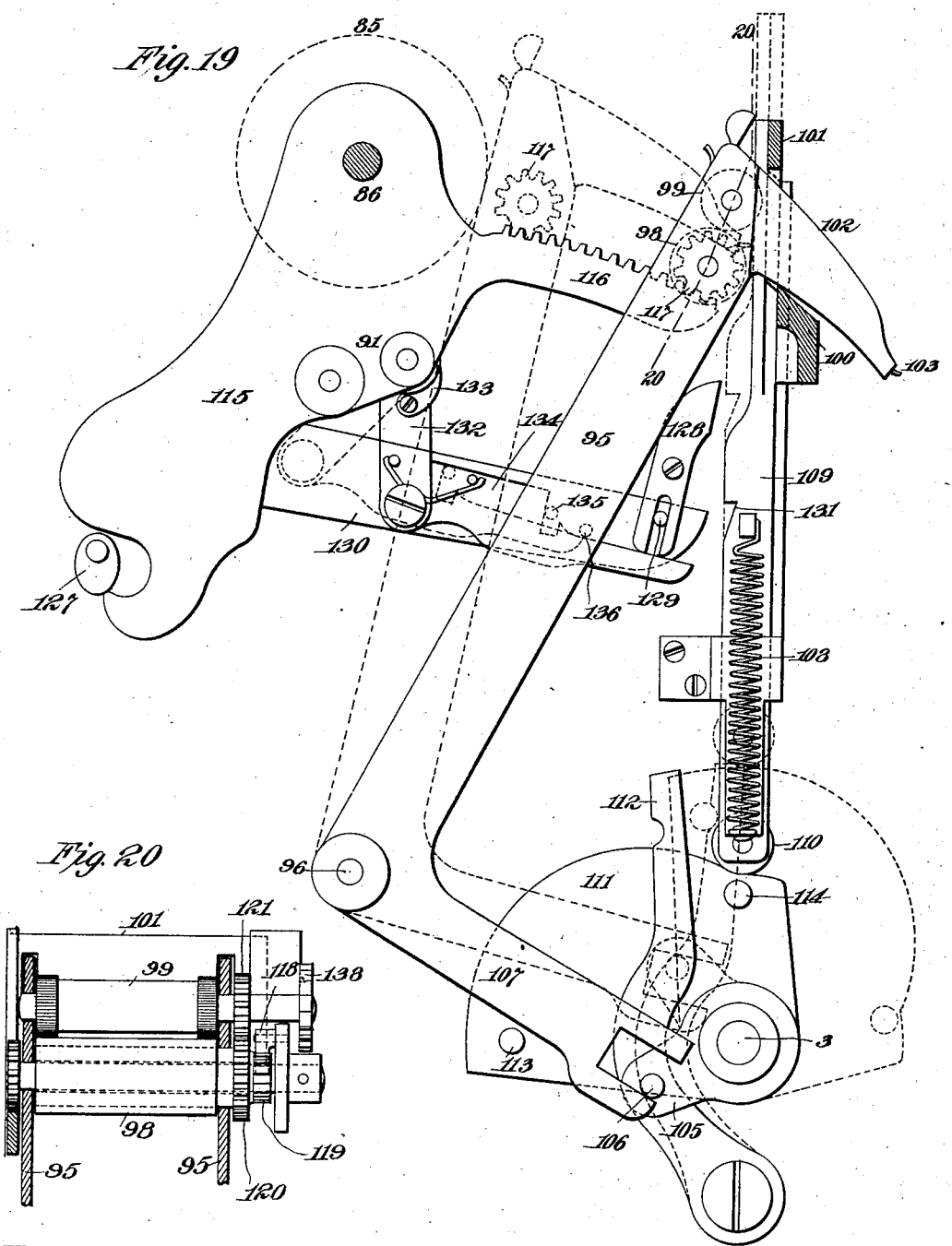

In the drawings, Figure 1 is a plan view showing a single bank of keys, the casing being removed; Fig. 2, a vertical sectional view through one of the keys and register; Fig. 3, a vertical section showing particularly the tablet-releasing mechanism and key-trap release; Fig. 4, an end view of the interior mechanism, showing particularly the tripping device for the till-cover, the end of the case being removed; Fig. 5, a rear view; Fig. 6, a side elevation from the printing side; Fig. 6ª, a view of a check; Fig. 7, a perspective view showing one of the tablet-rods; Fig. 8, a cross-section of the same on line 8 8; Fig. 9, an enlarged view of a portion of the key-trap, showing two of the trapping-sections; Fig. 10, a longitudinal section of the same; Fig. 11, an elevation of the total-adding mechanism from the setting side; Fig. 12, a similar view from the other side; Fig. 13, a plan view of the same; Fig. 14, a section through one of the register-wheels; Fig. 15, a detail perspective view of one side of the total-adding mechanism, showing the shift-arm of the carrying-shaft and the inthrow and outthrow cams; Fig. 16, detail views of the five-cent wheel; Fig. 17, a section through the printing mechanism, showing the cut-off and feed mechanisms out of gear; Fig. 18, a section on line 18 18 of Fig. 17; Fig. 19, a detail elevation of the printing mechanism, showing the cut-off and feed mechanisms in operation, and Fig. 20 a section on line 20 20 of Fig. 19.

In all of the above views corresponding parts are represented by the same numerals of reference.

In the particular type of cash-register shown in these drawings a stationary till 1 is employed, having a pivoted cover 2, adapted to be thrown back to disclose the till when desired. This cover is mounted on pivots 3 3 in the sides of the machine.

4 is an actuator, which in this instance trips the cover, exposes the tablet, operates the register, and effects the printing or embossing. This actuator comprises a bar connected across two pivoted plates 5 5, mounted on the pivots 3 at either side of the supporting ends of the cover 2. The actuator 4 is normally locked in a closed position by a locking-pawl 6, which engages a toothed plate 7, as is common in the art. Preferably a full-stroke mechanism is employed to compel a complete movement of the actuator, and in the present instance this mechanism comprises a serrated rack 8, with which a double-acting pawl 9 engages, as is also common. The negative stroke of the actuator may be accomplished by hand, as is obvious, but preferably the actuator is returned to the closed position by means of the spring $5^a$, as shown in Fig. 3. The cover 2 is locked normally in a closed position by means of a latch 10, mounted on a sleeve 11 at one or both sides of the machine. The said latch engages a pin 12, carried by the cover. The sleeve 11 of this latch carries a downwardly-extending arm 13, with which a pin 14, carried on one or both of the segments 5, engages to actuate the arm to release the latch 10 from the pin 12 near the completion of the positive stroke of the actuator 4. When the cover is thus released, it is preferably opened by one or more springs 15. A series of keys 16 are employed mounted on a bar 17 and each key being impelled upward by a spring 18, mounted in recesses in a bar 19. Mounted above the tails of the keys is a universal bar 20, connecting at each end to a rock-shaft 21, carrying an arm 22, which engages the locking-pawl 6. By depressing a key the universal bar 20 will be elevated, the arm 22 depressed, and the locking-pawl 6 moved out of engagement with the plate 7, thus releasing the actuator and permitting it to be actuated to trip the till-cover near the completion of its positive stroke. The tails of the keys 16 engage under lugs formed on the tablet-rods 23, and by depressing a key a selected tablet-rod will be slightly elevated and placed in position to be engaged by a tablet-lifting bar. Provision is therefore made to lock a key in a depressed position to hold the tablet-rod for engagement with the tablet-lifting bar. The preferred form of key-lock is of the type described and claimed in my application for Letters Patent filed March 6, 1899, Serial No. 707,872. This mechanism comprises a plurality of locking-bars 24, having overlapping heads 25, in front of which the locking-arm 26 on each of the keys is adapted to engage. The locking-bars 24 are pivoted to a tilting bar 27, to which an arm 28 is connected, the latter being adapted to be actuated near the completion of the negative stroke of the actuator to tilt the bar 27, elevate the locking-bars 24, and release a trapped key. To effect this result, I employ a lever 29, loosely mounted on the rock-shaft 21 and having a finger which engages beneath a universal bar 31, extending beneath all of the locking-bars 24. The lever 29 is provided with an inclined cam-surface 32 thereon, with which a stud 33, carried by one of the segments 5, engages both on the positive and on the negative stroke. On the positive stroke the stud 33 engages the top of the cam-surface 32 to depress the lever 29 away from the trapping mechanism, but on the negative stroke the stud 33 engages positively the cam 32 to elevate the lever 29 to lift all of the locking-bars, thus releasing any trapped key or keys. Each of the tablet-rods 23 is made of two parts, one inclosing the other, as I described in my said application, the outer portion or sheath being engaged by the tails of the keys and being also engaged by the tablet-elevating bar, while the inner or sliding part is carried to the tablet proper and is provided with a pawl 34, adapted to engage a locking-wing 35 when the tablet is elevated. By making a tablet-rod of two parts, as I described in said application, the inner or sliding portion may be locked in an elevated position, while the sheath portion thereof will be allowed to descend with the tablet-elevating bar, whereby the possibility of a tablet failing to be elevated when the same key is pressed in quick succession is overcome. The tablet-holding wing 35 is loosely mounted on the rock-shaft 21, before described, and lever 29 is provided with a finger 36, adapted to engage one of the arms 37 of the supporting-wing 35 when the lever 29 is tilted downward by the stud 33 engaging the cam 32 at the commencement of the positive stroke of the actuator. Thus it will be seen that the single lever 29 performs two functions—i. e., at the commencement of the positive stroke of the actuator it is tilted downward to engage the finger 36 with the arm 37 to withdraw the wing 35, and thereby allow any exposed tablets to drop, this movement not affecting the key-trap mechanism, while at the completion of the negative stroke of the actuator the said lever is moved upward to elevate the key-trap mechanism and allow for the release of a depressed key, but not affecting the tablet-locking wing 35.

As I have explained, a selected tablet is elevated by means of a tablet-elevating bar, which mechanism will be now described. Two levers 38 38 are mounted in the side of the machine and are connected by links 39 with the segments 5 5 of the actuator. The connection between the links 39 and said segments is so disposed that near the completion of the positive stroke of the actuator upward movement of the levers 38 will be arrested, or nearly so. By thus giving to the levers 38 a constantly-decreasing rate of speed, and preferably by actually bringing the levers 38 to rest before motion of the actuator ceases, overthrow of the parts will be effectively prevented. This feature of my invention is described and claimed in my application for Letters Patent filed November 23, 1891, Serial No. 412,791. The levers 38 are forked at their ends and engage a bar 40, connected to the slides 41. These slides carry the tablet-elevating bar 42 at their upper ends, said bar being arranged below and normally slightly behind the feet of the tablet-rods 23. The slides 41 are each provided with a pin 43, engaging the cam-groove 44 at the sides of the machine, said groove being so formed as to cause the tablet-bar 42 to move upward and toward the tablet-rods when the slides 41 are elevated. These parts are so proportioned that when the tablet-rods are in their normal position tablet-bar 42 will pass above the feet of the rods without elevating them; but when any one of the rods is elevated slightly by one of the keys the bar 42 will be brought into position to engage the selected tablet-rod to move it to exposed position. Upon the negative stroke of the actuator the links 39 return the levers 38, positively withdrawing the tablet-bar and allowing the sheath portion of the elevated tablet-rod to descend with it. This movement of the levers 38 closes the cover 2 positively through the slotted links 45, as I described in my application first above referred to. The tablet-rods 23 are provided with shoulders 46, arranged in graduated vertical planes, which shoulders are adapted to engage a universal bar 47, connected to a segment 48, pivoted on a shaft 49. This is common. The depression of the keys of the different denominations will result in the selection of the tablet-rod, which upon being moved by the tablet-bar will cause corresponding extensive movement of the segment 48 and of the shaft 49, the former controlling the total-adding register and the latter the position of the printing-wheel, as will be explained. A slotted link 50 connects the universal bar 47 with the tablet-bar 42, whereby upon the negative stroke of the actuator the segment 48 will be returned positively to its normal position. If desired, the bar 27 may be provided with a finger-piece 51, by which it may be tilted to untrap the key at any time, thus permitting release of a key erroneously depressed. The segment 48 is in constant mesh with a gear 52, loose on a shaft 53, which I call the "resetting-shaft." The gear 52 is in mesh with a gear 54, loose on a shaft 55, which I call the "register-shaft." The gear 54 is connected to a disk 56, carrying a pawl 57, engaging with a ratchet on the inside of a register-disk 58. With a machine of the type shown employing a single bank of keys representing multiples of five from five cents to one dollar, inclusive, this five-cent disk 58 will carry all the representations of the keys. Mounted loosely on the register-shaft 55 are the additional register-wheels 59, 60, 61, and 62, representing, respectively, hundreds, thousands, tens of thousands, and hundreds of thousands. A carrying operation between the disks of lower and higher order is performed by means of carrying-wheels 63, loosely mounted on a shaft 64. These carrying-wheels or transfer-pinions are of the well-known intermittent type and need not be referred to in detail. This type of transfer-pinion, as is well known, locks the higher registering-wheel with which it connects against independent rotation, so that in resetting the wheel to zero it is necessary to move the transfer-pinion out of engagement with the register-wheel. The shaft 64 is movable in slotted ways 65 toward and away from the register-shaft 55, so as to disengage and engage the carrying-wheels with the several register-wheels. When the carrying-wheels 63 are moved away from the register-wheels, the former engage the stationary locking-teeth 66, so as to be secured against accidental rotation, whereby will be preserved the desired relation between the several carrying-wheels and the register-wheels. The shaft 64 is carried at each end in a slotted arm 67, surrounding the resetting-shaft 53. Each of these arms 67 is provided with two pins 68 and 69, each of the former being engaged by a cam 70, carried on the resetting-shaft, whereby upon the turning of said shaft cam 70 will move the shaft 64 toward the register-shaft 55. The pin 69 on each of the arms 67 engages a cam 71, also carried on the resetting-shaft for moving the shaft 64 away from the register-shaft 55. It will be understood that the pins 68 are shorter than the pins 69 and that the cams 70 are located within the cams 71, so that the pin 68 will not be affected by the latter cams. By means of these cams it will be observed that when the resetting-shaft is turned the shaft 64 will be moved first away from the register-shaft 55 to disengage the carrying-wheels 63 from the register-wheels and will then be returned toward the register-shaft to reëngage the said carrying-wheels with the register-wheels. During this interim provision is made for reversing the rotation of the register-shaft 55 to effect the resetting of the register-wheels. I therefore rigidly secure to the register-shaft 55 a gear 72, having a notch 73 located in a part of its periphery. A mutilated gear 74 is fast to the resetting-shaft 53, with its smooth portion normally engaging in the notch 73, whereby gears 72 and 74 will be normally locked together like a Geneva stop. The teeth on the gear 74 are sufficient in number to turn the gear 72 exactly one rotation, and they are so disposed with respect to the smooth portion of the mutilated gear 74 that they do not engage the gear 72 until the cams 71 have moved the shaft 64 to disengage the carrying-wheels 63 upon the register-wheels. At one portion at least of their periphery the teeth of the mutilated gear 74 are of a double width, as shown at 75, so as to engage the portion of the gear 72 outside of the notch 73. The resetting-shaft 53 is turned by a milled thumb-piece 76 and is normally locked against rotation by a latch 77 engaging a notched disk 78. The latch 77 is withdrawn by hand to release the resetting-shaft when the register-wheels are to be returned to zero. The reverse rotation of the register-shaft 55 restores the register-wheels in any suitable way. Preferably each register-wheel carries a pawl 79, adapted to work in an opening in a sleeve 80, connected to the said register-wheel and affording the bearing therefor on the shaft 55. The shaft 55 is provided with a longitudinal groove 81, into which the pawls 79 will drop when the groove is brought around into line with said pawls. In this way it will be seen that by giving the shaft 55 a complete turn the pawls 79 will engage the groove 81 at the proper time and all the wheels will be picked up and turned to zero by the movement of the shaft 55. In order to prevent overthrow of the register-wheels in the resetting operation, I prefer to employ a small swinging frame 82, pivoted below the register-wheels and adapted to be brought in line with pins 83, carried by the latter. The resetting-shaft 53 is provided with a cam 84 thereon, engaged beneath the frame 82 to elevate it in the path of the pins 83 during the resetting operation and withdrawing it from the path of said pins immediately at the end of the resetting operation. In this way the possibility of the register-wheels being overthrown by arresting rotation of the resetting-shaft intermediate of this full stroke will be prevented.

Referring now to the printing and embossing mechanism, I show a single printing and embossing wheel 85, carried loosely on a stub-shaft 86. It will be obvious that when an inking device is not used the printing-wheel will constitute an embossing-wheel. The printing-wheel 85 carries a gear-wheel, with which a toothed segment 88 engages, said segment being carried on the shaft 49. When the keys of the machine are arranged in a single bank only, a single printing or embossing wheel is required. When a different arrangement of keys is employed, the printing or embossing wheels will be changed to accord therewith. It will be understood that instead of using a printing or embossing wheel the printing or embossing type may be carried on a segment—as, for instance, upon the segment 88. The printing-wheel 85 carries a notched wheel 89, with which a friction-pawl 90 engages. This retards the rotation of the printing or embossing wheel and tends to prevent overthrow. Mounted below the printing-wheel 85 is an auxiliary recording device 91, comprising, preferably, a consecutive-numbering printer and a dater of any suitable type. An inking-roll 92 sweeps over the printing-wheels of the consecutive-numbering printer and dater and over the printing-wheel 85 at each operation to ink the same. This inking-roll may be inked in any suitable way. The inking-roll 92 is carried in a frame 94, pivoted loosely on the shaft 49, the end of the frame 94 being pivoted, as shown, to allow for a slight yielding of the inking-roll upon the printing-surface.

95 represents a swinging platen-frame pivoted at the side of the machine on a shaft 96 above a paper-reel 97. At the upper end of the platen-frame are the two feed-rolls 98 and 99, the frame also constituting a platen for receiving that portion of the paper which engages the printing-wheel 85. After leaving the two feed-rolls 98 and 99 the paper passes between the cut-off device comprising a stationary blade 100 and a movable blade 101, thence through a feed-chute 102, having, preferably, a spring-finger 103 for holding by friction a cut-off check therein. The platen-frame 95 connects by a link 104 with the swinging frame 94, so that as the platen is swung toward the type the inking-frame will be retracted to ink the wheels. This movement of the platen is effected, preferably, from the actuator 4 by an arm 105, carried on one of the pivots 3 outside of the machine, said arm having a pin 106 working in the forked end of an arm 107, connected to the platen 95. The movement of the actuator swings the pivot 3 to engage the pin 106 with the arm 107 to move the platen into contact with the type. The movable knife-blade 101 tends to be normally impelled downward by a sufficiently-powerful spring 108, which is secured to a slide 109, working in suitable guides and having an antifriction-roller 110 near its lower end, which engages with a cam-segment 111, carried by the adjacent pivot 3 of the actuator. The cam 111 is so formed that when the actuator is moved downward on the positive stroke the movable blade 101 will be elevated. The blade will be held in the elevated position by means of a latch 112, which engages beneath its lower end. This latch is actuated by a pin 113, carried on the segment 111, whereby after the segment 111 has elevated the movable blade 101 the pin 113 will engage the latch 112 to bring it into position below the slide 109, holding the blade 101 in its elevated position. The segment also carries a pin 114, which engages the latch 112 at the completion of the negative stroke to withdraw the latch from beneath the slide 109, thereby releasing the blade 101 and allowing spring 108 to actuate it to effect the cut-off. In order to provide for the feed in the printing of checks, I employ a swinging frame 115, pivoted on the shaft 86, carrying a rack 116, with which a pinion 117 on the shaft of the feed-roller 98 engages. The shaft of said feed-roller carries a pawl 118, engaging a ratchet 119, secured to a gear 120, which in turn is secured to the feed-roller 98. The gear 120 drives a gear 121, secured to the feed-roll 99. In this way it will be observed that as the platen 95 swings toward and away from the printing-wheels the pinion 117, engaging the rack 116, will be turned first in one direction and then in the other. The ratchet-and-pawl connection between the pinion and the feed-rolls allows the pinion to turn in one direction without effecting the feed, while in the other direction the feed will be effected.

When the register is to be used for obtaining a continuous record of the individual sales in close consecutive order on the paper strip, it is obvious that the cut-off mechanism and the consecutive-numbering counter require to be disconnected. The consecutive-numbering counter and the dater require to be thrown out of the path of the platen and the feed must be reduced within very much smaller limits. The mechanism by which these ends are effected coöperates, preferably, with a special key of the register, preferably one conveniently located with the other keys, whereby upon pressing said key prior to the registering of a sale the machine can be temporarily converted from a check-printer into a recording cash-register. This depressed key may be locked in its depressed position in any suitable way; but as this would render the said key useless for any other purpose I preferably accomplish this result in a manner to be hereinafter described. Assuming that these results are to be secured by the depression of a special key, I provide the corresponding tablet-rod 122 (which need not be provided with an indicating-tablet) with a stud 123, which engages a lever 124, pivoted to one of the sides of the register and carrying a segment 125, engaging a gear 126, mounted on a shaft which passes through the side wall of the register, carrying a cam 127 at its outer end. On the side of the special rod 122 opposite the stud 123 is a lug 123$^a$, which is engaged from below by a projection on the lower end of the sheath of the no-sale tablet-rod, whereby the special rod will be elevated with the no-sale tablet-rod whenever the no-sale key is operated. This is desirable as obviating the necessity of depressing the special key with the no-sale key whenever the use of the latter is desired, the special key being restored to its normal position at every operation of the machine. The cam 127 works in a notch formed in the swinging frame 115, and when operated serves to tilt the frame on its pivot to withdraw the rack 116 from the pinion 117, as shown in dotted lines in Fig. 17. The shaft 127$^a$ of the cam 127 extends through the casing and has at its outer end a finger-piece by means of which the cam may be rotated. Coöperating with notches in the inner side of the finger-piece is a spring-bolt 126$^a$, which serves to lock the cam against rotation, thereby holding the frame 115 in position for dating, numbering, and check-printing or for continuous-strip printing, it being understood that when the machine is performing the latter operation the feed-trough may be and preferably is omitted, the strip being led downward inside the casing after passing the rolls 98 and 99 and allowed to accumulate in the bottom of the casing.

128 represents a locking-finger having a forked end which is engaged by a pin 129 on an arm 130, carried by the swinging frame 115. This locking-finger is adapted to engage a notch 131 in the slide 109, carrying the movable knife 101. When the swinging frame 115 is moved by the operation of cam 127, finger 128 will be thrown in the path of the slide 109 to lock the knife in its elevated position, even when the latch 112 is removed from beneath its lower end.

The consecutive-numbering counter is operated by a swinging lever 132, carrying the usual feed-pawls 133, said lever having an arm 134 pivoted to its lower end. A pin 135 normally engages a notch in said arm, said pin being carried by the platen 95, whereby at the least movement of the platen the pawls 133 of the consecutive-numbering counter will be actuated to move the same forward one step. A pin 136 is carried on the arm 130 and is adapted to engage the lower end of the arm 134, whereby when the cam 127 swings the frame 115 the arm 134 will be withdrawn from the pin 135 and the swinging movement of the platen will not operate the consecutive-numbering counter. The consecutive-numbering counter and the dater are carried on the frame 115, so that the swinging movement of the latter carries both of these counters out of the path of the platen, as of course is necessary when only a consecutive recording of the sales on the strip is required. In order to provide for the feed movement which is necessary to effect a slow travel of the paper when the machine is operated as a continuous-record printer only, I provide a separate feed-pawl 137, mounted on a stationary pivot and adapted to engage a ratchet-wheel 138, formed on the feed-roll 99, whereby a small additional feeding operation is thus effected near the completion of the negative stroke of the platen either alone or in addition to the feed effected by the cooperation of the pinion 117 with the rack 116. The swinging platen 95 obviously is open in line with the printing-wheels to permit the paper within the same to be impressed or embossed by the latter. Opposite the open portion it is provided on its operative face with the spring-clips 139, in which a check may be inserted when it is desired to print an additional amount on a check already issued, as I will explain.

The operation of the machine is as follows: Assuming the same to be operated first for the printing of checks, the depression of the key 16 traps it in front of the head 25 of the corresponding locking-bar 24. This key occupies the only space between the locking-bars, wherefore another character-key cannot be depressed. The depression of the key operates the universal bar 20 to withdraw the latch 6 from engagement with the actuator 4. The actuator can now be moved downward, and near the completion of its stroke pin 14 engages the arm 13 to withdraw the latch 10 from the pin 12 of the cover 2. The latter is then opened by the spring 15. Preferably a small latch 140 may be employed to keep the cover permanently closed when the apparatus is being used as a check-printer. (See Fig. 2.) The depression of the key elevates the corresponding tablet-rod to a slight extent, and the selected tablet-rod will be thus held in intermediate position. The movement of the actuator 4 elevates the levers 38, raising the tablet-bar 42, which is moved inward to engage beneath the selected tablet-rod, which is then moved upward to exposed position. The tablet-rod will be locked in the exposed position by the engagement of the pawl 34 with the wing 35. At the opening movement of the actuator the stud 33, engaging the upper portion of the cam 32, will tilt the lever 29 downward, causing the finger 36 to engage the arm 37 and withdrawing the wing 35 to allow the previously-elevated tablet to drop. Upon the return stroke of the actuator 4 the link 45 positively closes the cover, if this has been permitted to open, and near the completion of this stroke the pin 33, engaging beneath the cam 32, causes the elevation of the lever 29, raising the locking-bars 24 and allowing the depressed key to be released. This permits the universal bar 20 to be returned to allow the latch 6 to again lock the actuator in its closed position. The elevation of the tablet-rod 23 causes the shoulder 46 thereof to engage the bar 47, which causes a movement of the segment 48 corresponding in extent to the position of the shoulder 46 on the tablet-rod coöperating with the key depressed. This movement of the segment 48 will operate the gears 52 and 54, and through the pawl 57 the register-wheel 58 will be turned to a corresponding extent. Upon the return movement of the actuator the segment 48 will be returned, which movement is permitted by the pawl 57. Carrying from the five-cent wheel to the succeeding wheels is effected through the carrying-wheels 63 in the usual way. In resetting the register the milled thumb-piece 76 is turned in the proper direction, whereupon the cams 71 will engage the pins 69, moving the shaft 64 away from the register-shaft 55. When the carrying-wheels have been thus disengaged from the register-wheels, the teeth of the mutilated wheel 74 engages gear 72 to give to the register-shaft 55 one complete turn. After making this turn the pawls 79 and the register-wheels will be successively picked up, and the register-wheels will be returned to zero. After the teeth of the mutilated wheel 74 have been disengaged from the gear 72 and the latter is again locked by the notch 73 coming in contact with the smooth portion of the mutilated gear the cams 70 engage the pin 68 and return the shaft 64 to its former position, engaging the carrying-wheels once more with the register-wheels. When this sequence of operation is completed, the latch 77 again engages the notch in the locking-wheel 78 to hold the parts in position for reregistration. The turning of the shaft 49 effects, through the segment 88, a movement of the printing or embossing wheel corresponding to the depressed key. The parts are so proportioned that the movement of the actuator first results in the ordinary turning of the shaft 49 to set the printing or embossing wheel, after which the pin 106 engages the forked end of the arm 107 to tilt the platen 95. In this movement the link 104 swings the frame backward, causing the inking-roll 92 to sweep over all the type of the printing mechanism, including the consecutive-numbering counter, the dater, and the printing-wheel. In this movement of the actuator, cam 111, engaging the roll 110, elevates the slide 109 to move the knife 101 against the tension of the spring 108. Near the completion of the positive stroke of the actuator the pin 113 engages the latch 112 and moves it into position below the slide 109, so as to hold the knife elevated until released. This movement also engages the surface of the paper at the cut-away portion of the platen with the type of the printing-wheel, of the consecutive-numbering counter, and of the dater, and a record is thus imprinted on the portion of the paper which will constitute the ultimate check. The movement of the platen 95 toward the printing mechanism on the positive stroke of the actuator also turns the pinion 117 by its engagement with the rack 116; but the feed-rolls 98 and 99 are not turned, owing to the ratchet connection. On the negative stroke of the actuator the cam 111 is withdrawn from the roller 110; but the knife is still elevated by the latch 112. In this movement the return rotation of the pinion 117 on the rack 116 causes the positive movement of the feed-rollers 98 and 99, by which the paper will be ejected through the trough 102 to the right length. It will be observed that the platen in moving away from the printing mechanism moves toward the check-opening, thereby avoiding the necessity of a very long feed movement of the check-strip. Near the completion of the negative stroke pin 114 engages the latch 112 and withdraws the same from beneath the slide 109, thus permitting the knife 101 to be moved downward by the spring 108, cutting off the paper between the two cutting edges. A check will thus be formed, which will remain in the trough 102, extending beyond the outer end thereof, and may be removed therefrom against the tension of the finger 103. This cut-off operation takes place when the platen 95 has reached its maximum travel away from the printing-wheels and is in a convenient position to be reached by the operator, the trough 102 extending through the opening in the casing.

When the apparatus is to be used as a simple cash-register, the special key is depressed prior to the operaton of the actuator. It will be understood that the trapping mechanism is of such a character as to permit the operation of the special key in addition to a numbered key when the former controls the cutting out of the feed and cut-off mechanisms. When the no-sale key is depressed, the operation of the tablet-bar causes the elevation of its tablet-rod 122, the special rod 122$^a$, and the turning of the cam 127. This movement swings the frame 115 on the pivot 86 and withdraws the consecutive-numbering counter and dater from the path of the platen. The printing-wheel therefore will print upon the paper either a proper designation for the no-sale operation or an ordinary zero. The swinging of the frame 115 causes the locking-finger 128 to engage the notch 131 in the slide 109, so as to hold the knife elevated even after the latch 112 is disengaged therefrom. The cut-off operation is thus avoided. The swinging of the frame 115 also causes the pin 136 to disengage the notch in the arm 134 from the pin 135 on the platen, whereby the movement of the platen does not operate the consecutive-numbering counter and the proper operation thereof is not interferred with. When the special key is depressed in conjunction with a numbered key, the operations just referred to take place, except that a movement of the printing-wheel 85 is effected through the operation of the shaft 49 to print upon the paper the amount corresponding to the depressed number-key. When a record is thus secured of the sale, the feed of the paper is effected by the engagement of the pawl 137 with the ratchet-wheel 138 on the negative stroke of the platen, it being remembered that the rack 116 is withdrawn from the pinion 117, which controls the principal feed of the feed-rolls. If after a check has been issued the customer makes an additional purchase which is to be recorded on the check, this may be done by reinserting the check through an opening in the casing and between the spring-clips 139 by depressing the special key to throw out the cut-off mechanism, the consecutive-numbering counter, and the dater by depressing the key representing the second or new sale and by operating the actuator. Obviously the new number that will be printed on the returned check will be the amount of the new sale beneath that of the old sale, neither the consecutive-numbering nor dating impression being repeated. This capacity of my machine I consider to be highly advantageous in practice, as it removes a fruitful source of fraud at the present time. The capacity of my machine also for use either as a check-printer or as a simple recorder makes it possible to issue checks therefrom far in excess of the capacity of the machine. It will be seen that by effecting a printing operation in connection with the special key to cut out the cut-off mechanism, the consecutive-numbering counter, and the dater any desired number of amounts may be printed in regular sequence on a strip, it being understood that the key manipulation for the last amount will not be in conjunction with the special key, whereby when the last amount is printed the check will be numbered, dated, and cut off. Thus a check for five dollars and fifty cents would appear as shown in Fig. 6ª when made on a machine of the capacity described.

Having now described my invention, what I claim as new, and desire to secure by Letters Patent, is as follows:

1. In a mechanical registering-machine, the combination with a series of keys representing different denominations, of a recording mechanism under the control of said keys and arranged to effect a record of the key manipulations upon a movable paper strip, a cut-off device for severing the strip into a series of checks, and means controlled by the key movement to disconnect the cut-off device, substantially as and for the purposes set forth.

2. In a mechanical registering-machine, the combination with a series of keys representing different denominations, of a recording mechanism under the control of said keys and arranged to effect a record of key manipulations upon a movable paper strip, means for giving to the strip a long or short feed, a cut-off device for severing the strip into a series of checks, and means controlled by the key movement to disconnect the cut-off device and to simultaneously effect a short feed of the strip, substantially as and for the purposes set forth.

3. In a mechanical registering-machine, the combination with a series of keys representing different denominations, of a recording mechanism under the control of said keys and arranged to effect a record of key manipulations upon a movable paper strip, double-feed mechanism for successively giving to the strip two feed movements of different amplitude, a cut-off device for severing the strip into a series of checks, and means for disconnecting the cut-off device and for simultaneously disconnecting the greater feed, substantially as set forth.

4. In a mechanical registering-machine, the combination with a series of keys representing different denominations, of a recording mechanism under the control of said keys and arranged to effect a record of key manipulations upon a movable paper strip, double-feed mechanism for successively giving to the strip two feed movements of different amplitude, a cut-off device for severing the strip into a series of checks, and means controlled by the key movement for disconnecting the cut-off device and for simultaneously disconnecting the greater feed, substantially as set forth.

5. In a mechanical registering-machine, the combination with a series of keys representing different denominations, of a recording mechanism under the control of said keys and arranged to effect a record of key manipulations upon a movable paper strip, an auxiliary recording mechanism arranged to effect a record, such as the date, upon said strip, a cut-off device for severing the strip into a series of checks, and means for disconnecting the cut-off device and said auxiliary recording mechanism, only whereby the amounts of a number of transactions may be printed on a single check, substantially as set forth.

6. In a mechanical registering-machine, the combination with a series of keys representing different denominations, of a recording mechanism under the control of said keys and arranged to effect a record of key manipulations upon a movable paper strip, an auxiliary recording mechanism arranged to effect a special record, such as the date, upon said strip, a cut off device for severing the strip into a series of checks, and means controlled by the key movement for disconnecting the cut-off device and said auxiliary recording mechanism, substantially as set forth.

7. In a mechanical registering-machine, the combination with a series of keys representing different denominations, of a recording mechanism under the control of said keys and arranged to effect a record of key manipulations upon a movable paper strip, two auxiliary recording mechanisms arranged to effect upon a strip a record of the date and of consecutive numbers, a cut-off device for severing the strip into a series of numbered and dated checks, and means for disconnecting the cut-off device and both of said auxiliary recording mechanisms, only whereby the amounts of a number of transactions may be printed on a single check, substantially as set forth.

8. In a mechanical registering-machine, the combination with a series of keys representing different denominations, of a recording mechanism under the control of said keys and arranged to effect a record of key manipulations upon a movable paper strip, two auxiliary recording mechanisms arranged to effect upon a strip a record of the date and of consecutive numbers, a cut-off device for severing the strip into a series of numbered and dated checks, and means for simultaneously disconnecting the cut-off device and said auxiliary recording mechanisms, only whereby the amounts of a number of transactions may be printed on a single check, substantially as set forth.

9. In a mechanical registering-machine, the combination with a series of keys representing different denominations, of a recording mechanism under the control of said keys and arranged to effect a record of key manipulations upon a movable paper strip, two auxiliary recording mechanisms arranged to effect upon a strip a record of the date and of consecutive numbers, a cut-off device for severing the strip into a series of numbered and dated checks, and means controlled by the key movement for disconnecting the cut-off device and both of said auxiliary recording mechanisms, substantially as set forth.

10. In a mechanical registering-machine, the combination with a series of keys representing different denominations, of a recording mechanism under the control of said keys and arranged to effect a record of key manipulations upon a movable paper strip, two auxiliary recording mechanisms arranged to effect upon a strip a record of the date and of consecutive numbers, a cut-off device for severing the strip into a series of numbered and dated checks, and a cam for disconnecting the cut-off device and auxiliary recording mechanisms, only whereby the amounts of a number of transactions may be printed on a single check, substantially as set forth.

11. In a mechanical registering-machine, the combination with a series of keys representing different denominations, of a recording mechanism under the control of said keys and arranged to effect a record of key manipulations upon a movable paper strip, two auxiliary recording mechanisms arranged to effect upon a strip a record of the date and of consecutive numbers, a cut-off device for severing the strip into a series of numbered and dated checks, a cam for disconnecting the cut-off device and auxiliary recording mechanisms, only whereby the amounts of a number of transactions may be printed on a single check, and a lock for holding said cam in position, substantially as set forth.

12. In a mechanical registering-machine, the combination with a series of keys representing different denominations, of a recording mechanism arranged to effect a record of key manipulations upon a movable paper strip, an actuator coöperating with the keys to set the recording mechanism and to subsequently effect a recording action, a cut-off device for severing the strip into a series of checks, and means controlled by the key movement and operated by the actuator to disconnect the cut-off device, substantially as set forth.

13. In a mechanical registering-machine, the combination with a series of keys representing different denominations, of a recording mechanism arranged to effect a record of key manipulations upon a movable paper strip, means for effecting a changeable feed of said strip, an actuator coöperating with the keys to set the recording mechanism, to then effect a recording action, and to then effect a feed of the strip, a cut-off device for severing the strip into a series of checks, and means operated by the actuator to disconnect the cut-off device and to effect a reduced feed of the strip, substantially as set forth.

14. In a mechanical registering-machine, the combination with a series of keys representing different denominations, of a recording mechanism arranged to effect a record of key manipulations upon a movable paper strip, means for effecting a changeable feed of said strip, an actuator coöperating with the keys to set the recording mechanism, to then effect a recording action, and to then effect a feed of the strip, a cut-off device for severing the strip into a series of checks, and means controlled by the keys but operated by the actuator to disconnect the cut-off device and to effect a reduced feed of the strip, substantially as set forth.

15. In a mechanical registering-machine, the combination with a series of keys representing different denominations, of a recording mechanism arranged to effect a record of key manipulations upon a movable paper strip, an auxiliary recording mechanism arranged to effect a record of the date upon said strip, an actuator coöperating with the keys to set the primary recording mechanism and to then effect a recording action, a cut-off device for severing the strip into a series of checks, and means for disconnecting the cut-off device and said auxiliary recording mechanism, only whereby the amounts of a number of transactions may be printed on a single check, substantially as set forth.

16. In a mechanical registering-machine, the combination with a series of keys representing different denominations, of a recording mechanism arranged to effect a record of key manipulations upon a movable paper strip, an auxiliary recording mechanism arranged to effect a record of the date upon said strip, an actuator coöperating with the keys to set the primary recording mechanism and to then effect a recording action, a cut-off device for severing the strip into a series of checks, and means controlled by the keys but operated by said actuator for disconnecting the cut-off device and said auxiliary recording mechanism, substantially as set forth.

17. In a mechanical registering-machine, the combination with a series of keys representing different denominations, a recording mechanism arranged to effect a record of key manipulations upon a movable paper strip, an auxiliary recording mechanism for effecting a record, such as the date, upon said strip, an actuator coöperating with the keys to set the primary recording mechanism and effect a recording action, means for giving to the strip a regulable feed, a cut-off device for severing the strip into a series of checks, and means operated by the actuator for disconnecting the cut-off device and the auxiliary recording device and reducing the feed movement of the strip, substantially as set forth.

18. In a mechanical registering-machine, the combination with a series of keys representing different denominations, of a recording mechanism arranged to effect a record of key manipulations upon a movable paper strip, a secondary recording mechanism arranged to effect a record, such as the date, upon said strip, an actuator coöperating with the keys and arranged to first set the primary recording mechanism and to then effect a recording action, means for giving to the strip two distinct and successive feed movements, a cut-off device for severing the strip into a series of checks, and means operated by the actuator for disconnecting the cut-off device, the auxiliary recording device and one of the feed movements, substantially as set forth.

19. In a mechanical registering-machine, the combination with a series of keys representing different denominations, of a recording mechanism arranged to effect a record of key manipulations upon a movable paper strip, a secondary recording mechanism arranged to effect a record of the date upon said strip, an actuator coöperating with the keys and arranged to first set the primary recording mechanism and to then effect a recording action, means for giving to the strip two distinct and successive feed movements, a cut-off device for severing the strip into a series of checks, and means controlled by the keys but operated by the actuator for disconnecting the cut-off device, the auxiliary recording device and one of the feed movements, substantially as set forth.

20. In a mechanical registering-machine, the combination with a series of keys representing different denominations, of a recording mechanism arranged to effect a record of key manipulations upon a movable paper strip, a secondary recording mechanism arranged to effect a record of the date upon said strip, an actuator coöperating with the keys and arranged to first set the primary recording mechanism and to then effect a recording action, means for giving to the strip two distinct and successive feed movements, a cut-off device for severing the strip into a series of checks, means for giving to the paper two distinct feed movements of different amplitude, and means operated by the actuator for disconnecting the cut-off device, the auxiliary recording device and the feed movement of greater amplitude, substantially as set forth.

21. In a mechanical registering-machine, the combination with a series of keys representing different denominations, of a recording mechanism under the control of said keys and arranged to effect a record of key manipulations upon a movable paper strip, means for giving to the strip two distinct feed movements, a cut-off device for severing the strip into a series of checks, and means for disconnecting the cut-off device and one of said feed movements, substantially as set forth.

22. In a mechanical registering-machine, the combination with a series of keys representing different denominations, of a recording mechanism under the control of said keys and arranged to effect a record of key manipulations upon a movable paper strip, means for giving to the strip two distinct feed movements of different amplitude, a cut-off device for severing the strip into a series of checks, and means for disconnecting the cut-off device and one of said feed movements, substantially as set forth.

23. In a mechanical registering-machine, the combination with a series of keys representing different denominations, of a recording mechanism arranged to effect a record of key manipulations upon a movable paper strip, two auxiliary recording mechanisms arranged to effect upon the strip a record of the date and a consecutive number, an actuator coöperating with the keys for first setting the primary recording mechanism and then effecting a recording action, a cut-off device for severing the strip into a series of checks, and means for disconnecting the cut-off device and the auxiliary recording mechanisms only, substantially as set forth.

24. In a mechanical registering-machine, the combination with a series of keys representing different denominations, of a recording mechanism arranged to effect a record of key manipulations upon a movable paper strip, two auxiliary recording mechanisms arranged to effect upon the strip a record of the date and a consecutive number, an actuator coöperating with the keys for first setting the primary recording mechanism and then effecting a recording action, a cut-off device for severing the strip into a series of checks, and means for simultaneously disconnecting the cut-off device and the auxiliary recording mechanisms only whereby the amounts of a number of transactions may be printed on a single check, substantially as set forth.

25. In a mechanical registering-machine, the combination with a series of keys representing different denominations, of a recording mechanism arranged to effect a record of key manipulations upon a movable paper strip, two auxiliary recording mechanisms arranged to effect upon the strip a record of the date and a consecutive number, an actuator coöperating with the keys for first setting the primary recording mechanism and then effecting a recording action, a cut-off device for severing the strip into a series of checks, and means controlled by the keys but operated by the actuator for disconnecting the cut-off device and both of the auxiliary recording mechanisms, substantially as set forth.

26. In a combined cash-register and check-printer, the combination with a series of keys representing different denominations, a stationary till and a movable till-cover, of a recording mechanism under the control of the keys and operated by the till-cover for effecting a record of key manipulations upon a movable paper strip, a cut-off device for severing the strip into a series of checks, and means controlled by the key movement to disconnect the cut-off device, substantially as set forth.

27. In a combined cash-register and check-printer, the combination with a series of keys representing different denominations, a stationary till and a rotary till-cover, of a recording mechanism under the control of the keys and operated by the till-cover for effecting a record of key manipulations upon a movable paper strip, a cut-off device for severing the strip into a series of checks, and means controlled by the key movement to disconnect the cut-off device, substantially as set forth.

28. In a combined cash-register and check-printer, the combination with a series of keys representing different denominations, a stationary till and a movable cover therefor, of a recording mechanism under the control of said keys and operated by the till-cover to effect a record of key manipulations upon a movable paper strip, means controlled by the cover to effect a regulable feed of said strip, a cut-off device for severing the strip into a series of checks, and means operated by the cover for disconnecting the cut-off device and for reducing the feed of said strip, substantially as set forth.

29. In a combined cash-register and check-printer, the combination with a series of keys representing different denominations, a stationary till and a movable cover therefor, of a recording mechanism under the control of said keys and operated by the till-cover to effect a record of key manipulations upon a movable paper strip, means controlled by the cover to effect a regulable feed of said strip, a cut-off device for severing the strip into a series of checks, and means controlled by the keys but operated by the cover for disconnecting the cut-off device and for reducing the feed of said strip, substantially as set forth.

30. In a combined cash-register and check-printer, the combination with a series of keys representing different denominations, a stationary till and a movable cover therefor, of a recording mechanism under the control of the keys and operated by the movable cover to effect a record of key manipulations upon a movable paper strip, an auxiliary recording mechanism arranged to effect upon the strip a record of the date, a cut-off device for severing the strip into a series of checks, and means operated by the cover for disconnecting the cut-off device and said auxiliary recording mechanism, substantially as set forth.

31. In a combined cash-register and check-printer, the combination with a series of keys representing different denominations, a stationary till and a movable cover therefor, of a recording mechanism under the control of the keys and operated by the movable cover to effect a record of key manipulations upon a movable paper strip, an auxiliary recording mechanism arranged to effect upon the strip a record of the date, a cut-off device for severing the strip into a series of checks, and means controlled by the keys but operated by the cover for disconnecting the cut-off device and said auxiliary recording mechanism, substantially as set forth.

32. In a combined cash-register and check-printer, the combination with a series of keys representing different denominations, a stationary till and a movable cover therefor, of a recording mechanism under the control of the keys and operated by said cover arranged to effect a record of key manipulations upon a movable paper strip, means operated by the cover for giving to the strip a regulable feed movement, a cut-off device for severing the strip into a series of checks, and means operated by the cover for disconnecting the cut-off device and reducing the feed, substantially as set forth.

33. In a combined cash-register and check-printer, the combination with a series of keys representing different denominations, a stationary till and a movable cover therefor, of a recording mechanism under the control of the keys and operated by said cover arranged to effect a record of key manipulations upon a movable paper strip, means operated by the cover for giving to the strip a regulable feed movement, a cut-off device for severing the strip into a series of checks, and means controlled by the keys but operated by the cover for disconnecting the cut-off device and reducing the feed, substantially as set forth.

34. In a combined cash-register and check-printer, the combination with a series of keys representing different denominations, a stationary till and a movable cover therefor, of a recording mechanism under the control of the keys and operated by said cover to effect a record of key manipulations upon a movable paper strip, two auxiliary recording devices arranged to effect upon the strip a record of the date and of a consecutive number, a cut-off device for severing the strip into a series of checks, and means operated by the cover for disconnecting the cut-off device and said auxiliary recording mechanisms, substantially as set forth.

35. In a combined cash-register and check-printer, the combination with a series of keys representing different denominations, a stationary till and a movable cover therefor, of a recording mechanism under the control of the keys and operated by said cover to effect a record of key manipulations upon a movable paper strip, two auxiliary recording devices arranged to effect upon the strip a record of the date and of a consecutive number, a cut-off device for severing the strip into a series of checks, and means operated by the cover for simultaneously disconnecting the cut-off device and said auxiliary recording mechanisms, substantially as set forth.

36. In a combined cash-register and check-printer, the combination with a series of keys representing different denominations, a stationary till and a movable cover therefor, of a recording mechanism under the control of the keys and operated by said cover to effect a record of key manipulations upon a movable paper strip, two auxiliary recording devices arranged to effect upon the strip a record of the date and of a consecutive number, a cut-off device for severing the strip into a series of checks, and means controlled by the keys but operated by the cover for disconnecting the cut-off device and said auxiliary recording mechanisms, substantially as set forth.

37. In a mechanical registering-machine, the combination with a series of keys representing different denominations, of a recording mechanism controlled by said keys, a platen movable toward and away from said recording mechanism, and clips carried by the platen for clasping and supporting an issued check for reprinting, substantially as set forth.

38. In a mechanical registering-machine, the combination with a series of keys representing different denominations, of a recording mechanism controlled by said keys, and a platen movable toward said recording mechanism to make an impression, and toward a check-issuing opening to project the check into position to be grasped by the operator, substantially as set forth.

39. In a mechanical registering-machine, the combination with a series of keys representing different denominations, of a recording mechanism controlled by said keys, a platen movable toward and away from said recording mechanism, and spring-clips carried by the platen for clasping and supporting an issued check for reprinting, substantially as set forth.

40. In a mechanical registering-machine, the combination with a series of keys representing different denominations, of a recording mechanism controlled by said keys, a platen movable toward and away from said recording mechanism, and a feed-trough having spring-clips and carried by the platen and through which issued checks are fed, substantially as set forth.

41. In a mechanical registering-machine, the combination with a series of keys representing different denominations, of a recording mechanism controlled by said keys, a platen movable toward and away from said recording mechanism, a feed-trough carried by the platen through which issued checks are fed, and a resilient finger carried by said feed-trough for holding the issued checks therein, substantially as set forth.

42. In a mechanical registering-machine, the combination with a series of keys representing different denominations, of a recording mechanism controlled by said keys, a platen movable toward and away from said recording mechanism, a feed-trough carried by the platen through which the issued checks are fed, spring holding-clips in the feed-trough and a cut-off mechanism between the feed-trough and the platen, substantially as set forth.

43. In a mechanical registering-machine, the combination with a series of keys representing different denominations, of a recording mechanism controlled by the keys for effecting a record of key manipulations, an auxiliary recording mechanism for effecting a record of the date, a platen movable toward and away from both recording mechanisms, means carried by the platen for supporting an issued check for reprinting, and means for retracting the auxiliary recording mechanism from the platen, substantially as set forth.

44. In a mechanical registering-machine, the combination with a series of keys representing different denominations, of a recording mechanism controlled by the keys for effecting a record of key manipulations, two auxiliary recording devices for effecting records respectively of the date and of consecutive numbers, a platen movable toward and away from said recording mechanisms, means carried by the platen for supporting an issued check for reprinting, and means for withdrawing both of the auxiliary recording mechanisms from the platen, substantially as set forth.

45. In a mechanical registering-machine, the combination with a series of keys representing different denominations, of a recording mechanism controlled by the keys, a platen movable toward and away from said recording mechanism, regulable feed devices carried by the platen arranged to feed the paper strip, and means controlled by the key movement for operating the feed of said strip, substantially as set forth.

46. In a mechanical registering-machine, the combination with a series of keys representing different denominations, of a recording mechanism controlled by said keys, a platen movable toward and away from said recording mechanism, a feed-roller carried by the platen, a pinion for driving said roller, a rack with which said pinion normally engages, and means for withdrawing the rack out of the path of said pinion, so that the latter may move with the platen without being rotated, substantially as set forth.

47. In a mechanical registering-machine, the combination with a series of keys representing different denominations, of a recording mechanism controlled by said keys, a platen movable toward and away from said recording mechanism, a feed-roller carried by the platen, a pinion for driving said roller, a rack with which said pinion normally engages, and means controlled by the key movement for withdrawing the rack from said pinion, substantially as set forth.

48. In a mechanical registering-machine, the combination with a series of keys representing different denominations, of a recording mechanism controlled by said keys, a platen movable toward and away from said recording mechanism, a feed-roller carried by the platen, a pinion for driving said roller, a rack with which said pinion normally engages, means for withdrawing the rack from said pinion, and an auxiliary feed mechanism for driving said feed-roller, substantially as set forth.

49. In a mechanical registering-machine, the combination of a recording mechanism, means for setting the same, an auxiliary recording mechanism, a platen normally coöperating with both of the recording mechanisms, and means for disconnecting the auxiliary recording mechanism without disconnecting the first-mentioned recording mechanism, substantially as set forth.

50. In a mechanical registering-machine, the combination with a recording mechanism, means for setting the same, and an auxiliary recording mechanism regulably movable with respect to the same, of a platen normally coöperating with both of the recording mechanisms, and means for moving the auxiliary recording mechanism radially away from the platen, substantially as set forth.

51. In a mechanical registering-machine, the combination of a recording mechanism, means for setting the same, a platen having movement through an arc of constant amplitude and carrying a paper strip and coöperating with the recording mechanism, means for effecting a regulable feed of said strip, a cut-off device, and means for disconnecting the cut-off device and for reducing the feed and still allowing a full stroke of the platen, substantially as set forth.

52. In a mechanical registering-machine, the combination with a recording mechanism and means for setting the same, of a platen carrying a paper strip and coöperating with the recording mechanism, a cut-off device, a feed mechanism for giving to the strip two successive feed movements, and means for disconnecting the cut-off device and for disconnecting one of said feed movements, substantially as set forth.

53. In a mechanical registering-machine, the combination with a recording mechanism and means for setting the same, of a platen carrying a paper strip and coöperating with the recording mechanism, a cut-off device, a feed mechanism for giving to the strip two successive feed movements, and means for simultaneously disconnecting the cut-off device and for disconnecting one of said feed movements, substantially as set forth.

54. In a mechanical registering-machine, the combination with a recording mechanism and means for setting the same, of an auxiliary recording mechanism, a platen carrying a paper strip and normally coöperating with both of said recording mechanisms, connections between the platen and the auxiliary recording mechanism for operating the latter, and means for disconnecting the auxiliary recording mechanism from the platen, substantially as set forth.

55. In a mechanical registering-machine, the combination with a recording mechanism and means for setting the same, of an auxiliary recording mechanism, a platen carrying a paper strip and normally coöperating with both of said recording mechanisms, connections between the platen and the auxiliary recording mechanism for operating the latter, and means for disconnecting the auxiliary recording mechanism from the platen and for simultaneously withdrawing the auxiliary mechanism from the platen, substantially as set forth.

56. In a mechanical registering-machine, the combination with a recording mechanism and means for securing the same, of a frame movable with respect to the recording mechanism, two auxiliary recording mechanisms carried by said frame, a platen carrying a paper strip and coöperating with all of the recording mechanisms, and means for swinging the said frame to withdraw the auxiliary recording mechanism from the path of the platen, substantially as set forth.

57. In a check-printing machine, the combination with a recording mechanism, of a platen movable with respect to the same and carrying a paper strip, an actuator for operating the platen, a cut-off knife for severing the strip, and means controlled by the actuator for setting the knife against tension and subsequently tripping it, substantially as set forth.

58. In a check-printing machine, the combination with a recording mechanism, of a platen movable with respect to the same and carrying a paper strip, an actuator for operating the platen, a cut-off knife for severing the strip, means controlled by the actuator for setting the knife against tension and subsequently tripping it, and means operated upon the positive stroke of the actuator to set the knife and upon the negative stroke to release the knife, whereby the strip will be severed, substantially as set forth.

59. In a check-printing machine, the combination with a recording mechanism, of a platen movable toward and away from the same and carrying a strip of paper, a cut-off knife, an actuator for moving the platen, a cam carried by the actuator for setting the knife, and a latch for holding the knife in a set position, operated upon the negative stroke of the actuator to release the knife, substantially as set forth.

60. In a check-printing machine, the combination of a recording mechanism, a platen movable toward and away from the same and carrying a strip of paper, a cut-off knife, an actuator for operating the platen, a cam carried by the actuator for setting the knife, a latch arranged to hold the knife in a set position, a pin on the cam for setting the latch, and a second pin on said cam for tripping the latch, substantially as set forth.

61. In a check-printing machine, the combination with a recording mechanism, of a platen carrying a strip of paper, a cut-off knife, an actuator for operating the platen, means controlled by the actuator to operate the knife, and a latch for holding the knife in a negative position out of the control of said actuator, substantially at set forth.

62. In a check-printing machine, the combination with a recording mechanism, of a platen carrying a strip of paper coöperating with the same, an auxiliary recording mechanism, a cut-off knife arranged to be first set and then released, and means for disconnecting the auxiliary recording mechanism and for holding said cut-off knife in its set position, substantially as set forth.

63. In a check-printing machine, the combination with a recording mechanism, of a platen carrying a strip of paper coöperating with the same, an auxiliary recording mechanism, a cut-off knife arranged to be first set and then released, and means for simultaneously disconnecting the auxiliary recording mechanism and for holding said cut-off knife in its set position, substantially as set forth.

64. In a cash-register of the type described, the combination of a series of selective keys, a stationary till, a movable cover, a latch for holding said cover in a normally closed position, an arm depending from said latch, an actuator independent of the keys but released by the same, and a stud on said actuator engaging said arm for releasing the latch, substantially as set forth.

65. In a cash-register of the type described, the combination of a series of selective keys, a stationary till, a movable cover, a latch for holding said cover in a normally closed position, an arm depending from said latch, an actuator independent of the keys but released by the same, a stud on said actuator engaging said arm for releasing the latch, and a spring for opening said cover when released, substantially as set forth.

66. In a cash-register, the combination with a series of tablet-rods and a series of keys for moving the tablet-rods toward indicating position, of an actuator, a tablet-bar, and a cam for moving the tablet-bar inward to engage a selected tablet-rod and then immediately toward the exposed position to expose it, substantially as set forth.

67. In a cash-register, the combination with a series of selective keys and a series of tablet-rods, of an actuator independent of the keys but released by the same for exposing the tablet-rods, a locking-wing for locking the tablet-rods in an exposed position, a pivoted lever arranged, when moved in one direction only, to disengage the locking-wing, and a cam carried by said lever and engaged by the actuator, substantially as set forth.

68. In a cash-register, the combination of a series of keys, a trapping device for a depressed key, an actuator coöperating with the key, a pivoted lever arranged to release the trapping device, and a cam carried by the lever and engaged by the actuator, substantially as set forth.

69. In a cash-register, the combination of a series of keys, a trapping device for a depressed key, an actuator coöperating with the key, a pivoted lever arranged to release the trapping device, and a cam carried by the lever and engaged by the actuator at the completion of its negative stroke, substantially as set forth.

70. In a cash-register, the combination of a series of keys, a trap for the same, a series of tablet-rods, a wing for holding the tablet-rods in an elevated position, an actuator coöperating with the keys for moving the tablet-rods, a pivoted lever operated by the actuator, and connections between said actuator and the key-trap and between said actuator and the tablet-locking wing, substantially as set forth.

71. In a cash-register, the combination of a series of keys, a trap for the same, a series of tablet-rods, a wing for holding the tablet-rods in an elevated position, an actuator coöperating with the keys for moving the tablet-rods, a pivoted lever operated by the actuator, and connections between said actuator and the key-trap and between said actuator and the tablet-locking wing, said mechanism being arranged to withdraw the tablet-locking wing at the commencement of the positive stroke of the actuator to relase a previously-elevated tablet-rod, substantially as set forth.

72. In a cash-register, the combination with manually-operative selective devices, of a register coöperating therewith comprising a register-shaft, a plurality of register-wheels on said shaft, a carrying-shaft movable toward and away from the register-shaft, carrying-wheels on said shaft, a resetting-shaft, and cams on said resetting-shaft for moving the carrying-shaft toward and away from the register-shaft, substantially as set forth.

73. In a cash-register, the combination with manually-operative selective devices, of a register coöperating therewith comprising a register-shaft, a plurality of register-wheels on said shaft, a carrying-shaft movable toward and away from the register-shaft, carrying-wheels on said shaft, a resetting-shaft, cams on said resetting-shaft for moving the carrying-shaft toward and away from the register-shaft, and connections between the resetting-shaft and the register-shaft, substantially as set forth.

74. In a cash-register, the combination with a suitable operating mechanism, of a register coöperating therewith, comprising a register-shaft, a plurality of register-wheels on said shaft, a carrying-shaft movable toward and away from said register-shaft, carrying-wheels on said shaft, a resetting-shaft, cams on said resetting-shaft for moving the carrying-shaft toward and away from the register-shaft, and connections between the resetting-shaft and the register-shaft, substantially as set forth.

75. In a cash-register, the combination with manually-operative selective devices, of a register coöperating therewith comprising a register-shaft normally held against rotation, a resetting-shaft, a series of register-disks loose on the register-shaft, a pinion on the register-shaft, and a mutilated gear on the resetting-shaft engaging said pinion, substantially as set forth.

76. In a cash-register, the combination with manually-operative selective devices, of a register coöperating therewith comprising a register-shaft normally held against rotation, a resetting-shaft, a series of register-disks loose on the register-shaft, a pinion on the register-shaft, and a mutilated gear on the resetting-shaft engaging said pinion, the pinion being cut away to receive the smooth portion of the mutilated gear, substantially as set forth.

77. In a cash-register, the combination with manually-operative selective devices, of a register coöperating therewith comprising a register-shaft, a plurality of register-disks carried by said register-shaft, a carrying-shaft movable toward and away from the register-shaft, carrying-wheels on the carrying-shaft, a resetting-shaft, cams on the resetting-shaft for moving the carrying-shaft toward and away from the register-shaft, a pinion on the register-shaft, and a mutilated gear on the resetting-shaft engaging said pinion for turning the register-shaft, substantially as set forth.

78. In a cash-register, the combination with manually-operative selective devices, of a register coöperating therewith comprising a register-shaft, a series of register-disks mounted on said shaft, a resetting-shaft, connections between the resetting-shaft and the register-shaft for resetting the disks to zero, an overthrow-bar adapted to be interposed in the path of the register-disk during the resetting operation, and a cam on the resetting-shaft for operating said overthrow-bar, substantially as set forth.

79. In a cash-register the combination with a recording mechanism including means for feeding a strip, type-carriers, a platen, a knife for severing the strip, and means for suspending the operation of the knife without interfering with the feed of the strip or the operation of the platen.

80. In a cash-register the combination with a series of type-carriers, devices for feeding a check-strip, a platen, a consecutive-numbering device, a knife for severing the strip, and mechanism whereby the action of the knife and consecutive-numbering device may be suspended without interfering with the printing or the feeding of the strip.

81. In a cash-register the combination with a series of type-carriers, a platen-lever, a platen mounted on said lever, and a paper-guide causing the paper to pass about the fulcrum of the lever and over the platen so that the movement of the lever will not affect the tension of the paper.

82. In a recorder for cash-registers, differential strip-feeding mechanisms, and means for rendering inoperative one of said mechanisms while the other continues to operate.

83. In a recorder for cash-registers, differential strip-feeding mechanisms, and means for causing one or both of said mechanisms to act upon the strip.

84. In a mechanical registering-machine, the combination with a series of keys representing different denominations, of a recording mechanism under the control of said keys and arranged to effect a record of key manipulations upon a movable paper strip, means for giving to the strip a long or short feed, a cut-off device for severing the strip into a series of checks, and means for disconnecting the cut-off device and simultaneously effecting a short feed of the strip, substantially as and for the purposes set forth.

This specification signed and witnessed this 28th day of March, 1899.

FRANCIS C. OSBORN.

Witnesses:
ANNIE MAY GREGORY,
BURT E. KNAPP.